March 2, 1948.  A. MACKMANN  2,436,930

MOTOR REDUCER UNIT

Filed Jan. 17, 1944

Inventor:
Arthur Mackmann,
By Davarn, Onns and Broth,
Attorneys.

Patented Mar. 2, 1948

2,436,930

UNITED STATES PATENT OFFICE 2,436,930

MOTOR REDUCER UNIT

Arthur Mackmann, Chicago, Ill., assignor to Foote Bros. Gear and Machine Corporation, Chicago, Ill., a corporation of Delaware Application January 17, 1944, Serial No. 518,623

8 Claims. (Cl. 172—36)

This invention relates to motor reducer units and more particularly to a unit containing both motor and speed reducer parts.

One of the objects of the invention is to provide a motor reducer unit including a yieldingly mounted bearing for supporting a shaft to permit gyratory movement of the shaft in the event of slight misalignment.

Another object of the invention is to provide a speed reducing drive unit in which the housing containing the motor carries a cartridge type reducer unit and the motor shaft is supported at one end by bearings in the reducer unit. According to one desirable construction, the motor shaft is connected to the driving shaft of the unit by a detachable coupling so that the unit can easily be installed and replaced.

Still another object of the invention is to provide a speed reducing drive unit in which air is circulated over both the motor parts and the gear reduction parts of the unit for cooling.

A further object of the invention is to provide a speed reducing drive unit in which air is drawn in at both ends of the housing and is blown out centrally of the housing to cool motor parts in the housing and a gear reduction unit casing carried by the housing.

The above and other objects and advantages of the present invention will be more readily apparent from the following description when read in connection with the accompanying drawing, in which—

Figure 1:
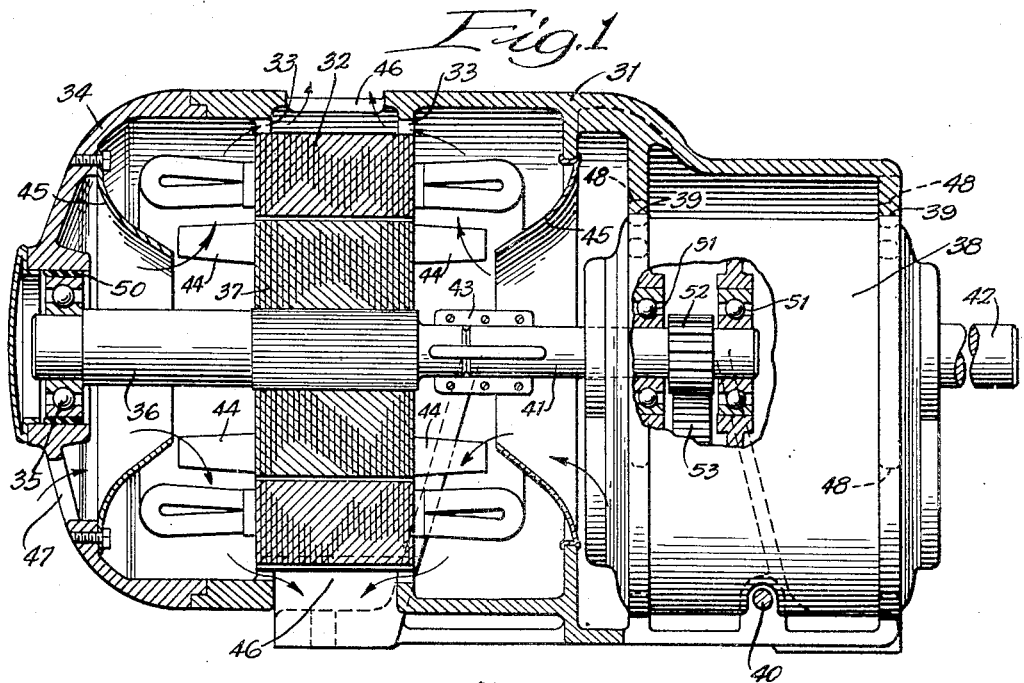
Figure 1 is a sectional view with parts in elevation of a drive unit embodying the invention.
Figure 2:
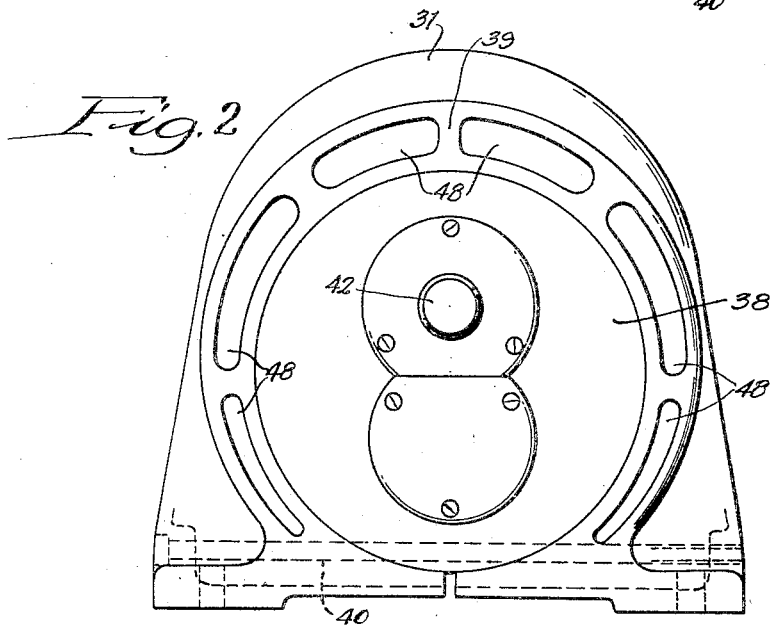
Figure 2 is an end elevation looking from the right of Figure 1.

According to one of the principal features of the present invention, a motor reducer unit is made up by attaching to a housing for the motor parts a cartridge type gear reducer which may be constructed as more particularly described and claimed in the copending application of Ardussi and Walsh, Serial No. 473,904, filed January 29, 1943, now abandoned. The present invention provides a construction by which reducer units of standard types may be easily assembled in a motor housing so that the motor housings and cartridge type units can be separately stocked and assembled as required.

As shown in the drawing the unit comprises an elongated motor housing 31 open at both ends and carrying motor field windings wound on a core 32 which is supported on internal annular flanges 33. One end of the housing adjacent the windings 32 is semi-permanently closed by an end cover 34 which may be bolted or otherwise attached to the housing and which carries a bearing 35 for the motor shaft 36. The shaft 36 carries an armature 37 cooperating with the field 32.

The gear reducer unit includes a generally cylindrical casing 38 which is detachably supported in inwardly extending annular flanges 39 in the housing. The casing may be secured in the housing by fastening means such as a bolt 40. Driving and driven shafts 41 and 42 are journalled in the casing and project from the opposite ends thereof, the shafts being connected by gearing in the casing to provide the desired torque transmission ratio therebetween.

As shown in partial section in Figure 1, the shaft 41 is supported on spaced bearings 51 in the casing 38 so that its axis is fixed relative to the casing. The shaft 41 carries a pinion 52 meshing with a gear 53 which may form a part of any desired type of gear train connecting the shafts 41 and 42.

The shafts 41 and 36 are adapted to be connected by a split coupling 43 bolted around the ends of the shafts and splined or keyed thereto. This coupling permits the reducer unit to be removed and replaced readily simply by sliding the shaft 41 out of the coupling. Assembled it supports the motor shaft 36 sufficiently that an additional bearing at the end thereof adjacent the reducer unit is not required.

In practice it may be very difficult to maintain perfect alignment between the shafts 36 and 41 and between the three bearings 35 and 51 and any slight misalignment, even a few thousandths of an inch, will stress the shafts and coupling, eventually causing crystallization. In order to eliminate this difficulty the bearing 35 is yieldingly supported in the housing on a ring 50 of rubber or the like. This construction permits the bearing to gyrate or float slightly in the event the shafts are not perfectly aligned thereby eliminating side strain in the shafts and coupling. This mounting also allows likewise movement without stress or thrust on the motor bearing. This feature makes it practical to stock the cartridge type gear units for interchangeable mounting in motor housings without requiring a prohibitive degree of accuracy in machining the several parts.

Cooling is effected by fan blades 44 extending axially from the armature 37. Shields or guards 45 are mounted in the housing and taper inwardly to direct incoming air to points radially within the blades 44. Operation of the blades will draw in air from the ends of the casing and force it out through openings such as shown at 46 in the sides of the housing. It will be noted that the openings 46 are in register with the windings 32 so that the air will flow around and cool these windings and then flow through openings in the flanges 33 and out the openings 46.

Inlet of air from the closed end of the housing is provided by one or more openings 47 in the end plate 34 discharging on the interior of the guard 45. At the opposite end of the housing air circulation is provided by openings 48 formed in the flanges 39. When the motor is in operation air will be drawn through the openings 48 and will circulate around the reducer casing 38 in direct contact therewith to cool the reducer unit. The air will thereafter pass through the guard 45 over the motor windings and out through the openings 46. Thus by this construction both the motor parts and the reducer unit are cooled by the same fan means. At the same time, easy installation and replacement of the reducer unit is not interfered with.

While one embodiment of the invention has been shown and described herein, it will be understood that this is illustrative only and is not intended as a definition of the scope of the invention, reference being had for this purpose to the appended claims.

What is claimed is:

1. A motor reducer unit comprising an elongated unitary housing, a motor element secured to the housing, a cartridge type gear unit fitting into the housing adjacent one end including a closed casing and driving and driven shafts projecting rotatably from the opposite ends of the casing, an extension on the driving shaft rigid therewith and projecting past the motor element, a motor element on the extension, a bearing to support the end of the extension, and yielding means supporting the bearing in the housing.

2. A speed reducing drive unit comprising a housing having a closed end and an open end, stationary motor windings in the housing adjacent the closed end, a gear reducer unit having a closed casing fitting into the open end of the housing, driving and driven shafts projecting from the opposite ends of the casing, gearing in the casing connecting the driving and driven shafts, a motor shaft extending through the windings and journalled at one end in the closed end of the housing with its other end free, means on the motor shaft cooperating with the windings to drive the motor shaft, and a detachable coupling connecting the other end of motor shaft to said driving shaft and serving as the sole support for the other end of the motor shaft.

3. A speed reducing drive unit comprising an elongated unitary housing having a closed end and an open end, stationary motor windings in the housing adjacent the closed end, a gear reducer unit having a closed casing fitting into the open end of the housing, a motor shaft extending through the windings journalled at one end in the closed end of the housing and connected at its other end to a driving element of the reducer unit, a driven shaft for the reducer unit extending beyond the outer end of the casing, fan means driven by the motor shaft to draw air in from the housing ends toward the winding and circulate it out through the sides of the housing, the housing being formed with passages around the reducer unit whereby the fan means will draw in air around the reducer unit to cool it.

4. A speed reducing drive unit comprising an elongated unitary housing having a closed end and an open end, stationary motor windings in the housing adjacent the closed end, a gear reducer unit having a closed casing fitting into the open end of the housing, a motor shaft extending through the windings journalled at one end in the closed end of the housing and connected at its other end to a driving element of the reducer unit, a driven shaft for the reducer unit extending beyond the outer end of the casing, fan blades carried by the motor shaft to circulate air inward from the ends of the housing and out through the sides of the housing, shields in the housing to direct the air to a point radially inward of the fan blades, the housing being formed with passages around the reducer unit casing whereby the fan blades will draw air in around the unit to cool it.

5. A speed reducing drive unit comprising a housing having a closed end and an open end, stationary motor windings in the housing adjacent the closed end, a gear reducer unit having a closed casing fitting into the open end of the housing, the housing being formed with spaced flanges engaging the casing to support it and there being openings in the flanges for circulation of air around the casing, a motor shaft in the housing driven by said windings, and fan means in the housing driven by the motor shaft to draw in air around the casing.

6. A speed reducing drive unit comprising a housing having a closed end and an open end, stationary motor windings in the housing adjacent the closed end, a gear reducer unit having a closed casing fitting into the open end of the housing, the housing being formed with spaced flanges engaging the casing to support it and there being openings in the flanges for circulation of air around the casing, a motor shaft in the housing driven by said windings, fan means in the housing driven by the motor shaft to draw in air around the casing, a bearing in the housing supporting one end of the motor shaft, the other end of the shaft being supported by the casing, and yielding means supporting the bearing in the housing.

7. A speed reducing drive unit comprising a housing having a closed end and an open end, stationary motor windings in the housing adjacent the closed end, a gear reducer unit having a closed casing rigidly supported in the open end of the housing, driving and driven shafts projecting from the opposite ends of the casing, a motor shaft extending through the windings, means on the motor shaft cooperating with the windings to drive the motor shaft, a detachable coupling rigidly connecting the one end of the motor shaft to the driving shaft through which the driving shaft serves as the sole support for said one end of the motor shaft, a bearing in the closed end of the housing supporting the other end of the motor shaft, and yielding mounting means for the bearing.

8. A speed reducing drive unit comprising a housing having a closed end and an open end, internal annular flanges in the housing adjacent the closed end having air flow openings therethrough for the flow of cooling air, the housing being formed with an air flow opening therethrough between the flanges, a motor winding carried by the flanges, a gear reducer unit including a closed casing fitting into the open end of the housing, a motor shaft extending through the winding journaled at one end in the closed end of the housing and connected at its other end to a driving element of the reducer unit, the housing being formed with air flow openings around the reducer unit casing for circulation of air over the casing, and fan means driven by the motor shaft to circulate air through the several air flow openings around the casing and the motor winding.

ARTHUR MACKMANN.

REFERENCES CITED

The following references are of record in the file of this patent:

UNITED STATES PATENTS

| Number | Name | Date |
|---|---|---|
| 1,044,338 | Bauroth | Nov. 12, 1912 |
| 1,871,835 | Batchelder | Aug. 16, 1932 |
| 1,928,965 | Dormeyer | Oct. 3, 1933 |
| 1,971,968 | Schmitter | Aug. 28, 1934 |
| 1,972,581 | Barker | Sept. 4, 1934 |
| 2,015,784 | Brown | Oct. 1, 1935 |
| 2,058,572 | Delaval-Crow | Oct. 27, 1936 |

FOREIGN PATENTS

| Number | Country | Date |
|---|---|---|
| 674,587 | France | Oct. 22, 1929 |